July 11, 1967  E. E. POWERS  3,330,547
TRACER CONTROLLED CUTTING APPARATUS
Filed July 31, 1964

INVENTOR.
ESTEL E. POWERS,
BY
*Youngblut, Melville, Strasser & Foster*

ATTORNEYS.

United States Patent Office 3,330,547
Patented July 11, 1967

3,330,547
TRACER CONTROLLED CUTTING APPARATUS
Estel E. Powers, Springfield, Ohio, assignor to Robbins & Myers, Inc., Springfield, Ohio, a corporation of Ohio
Filed July 31, 1964, Ser. No. 386,723
14 Claims. (Cl. 266—23)

This invention relates to a new and improved cutting apparatus, and more particularly to a tracer controlled apparatus adapted to cut a predetermined pattern on tubing of various types.

Tracer controlled cutting torches are of course old and well known in the art. In the conventional setup, a flat pattern describing the cut to be made is placed on a tracer table. A sensing element, such as an electric eye, then follows this pattern, and generates signals which in turn control an electric or hydraulic drive, which in turn moves a suitable cutting torch over the work piece. This arrangement is highly satisfactory for most cutting applications, so long as both the work piece and the pattern are substantially flat.

The arrangements of the prior art are not however, satisfactory for cutting various types of tubing. For example, it may be desirable in certain applications to completely sever a length of tubing into two separate portions, these portions being interlocked and non-separable without deformation. This requires the cutting of a scalloped design completely around the circumference of the tube.

It is therefore a primary object of this invention to provide a cutting apparatus which will satisfactorily sever cylindrical or other shapes of tubing.

A more specific object of the invention is to provide such an apparatus which is tracer controlled, whereby a predetermined cut may be made automatically.

Still another object of the invention is the provision of an apparatus for cutting tubing which utilizes a flat pattern for guiding the sensing head of the tracer control.

Still a further object of the invention is to provide an arrangement which requires only relatively minor modification of existing equipment.

Other objects and advantages of this invention will become apparent as this specification proceeds. Reference will be made from time to time to the accompanying drawings, in which.

Briefly, this invention contemplates an X-Y coordinate drive device, which is essentially two slides at right angles, these slides being driven in any suitable manner, and controlled by signals generated from a suitable sensing head. In the preferred form of the invention, the sensing head will be disposed at one end of one of the slides, and located over a tracer table, while a conventional cutting torch will be located at the other end of this slide, and disposed over the article being cut. In operation of the device, the cutting torch is moved longitudinally over the article being cut, and at the same time, moved in a perpendicular path transverse to the article being cut. As the cutting torch moves in this path transverse to the axis of the article being cut, means are provided for rolling the article being cut in the same direction, so that the cutting torch always remains centered over the longitudinal axis of the tubing. In this way, it is possible to follow a desired pattern, and make the cut all the way around the circumference of a piece of tubing of any shape.

Referring now more specifically to the drawings, the apparatus of this invention includes the slides 10 and 11, which are disposed at substantially right angles to each other. Inasmuch as the design and construction of these slides is conventional and well known in the art, they will not be described in detail in this application. Needless to say, the particular drive mechanism used for the slides is also old and conventional. It may further be noted that both hydraulic and electric drives are known, and the particular type utilized is of no consequence in the practice of this invention. As will be explained in more detail hereinafter, the drive mechanisms are responsive to signals generated by a sensing head.

Figure 2:
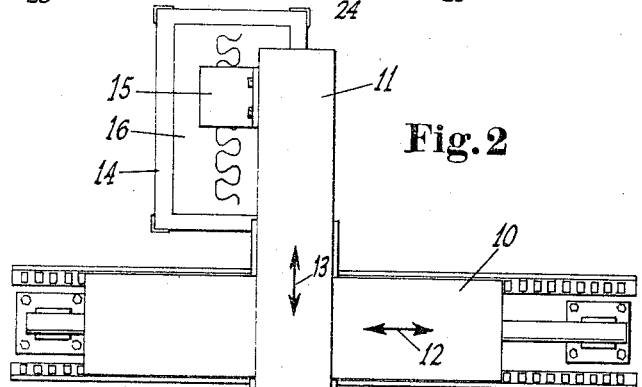
FIG. 2 is a top plan view of the apparatus of FIG. 1.

As best seen in FIG. 2, the slide 10 is adapted to reciprocate, as indicated by the arrow 12, while slide 11 is movable in a path perpendicular to the movement of the slide 10, as indicated by the arrow 13.

Secured to one end of the slide 11, and disposed over a suitable tracer table 14, is the sensing head 15. In the embodiment of the invention illustrated, the sensing head 15 includes an electric eye. The details and circuitry of this sensing head do not form a part of this invention.

Placed on the tracer table 14 is a suitable flat pattern 16 which contains a planar development of a line to be cut. It represents the cylindrical surface unrolled into a plane, and oriented so that the direction of unrolling is parallel to the path along which the article being cut is rolled.

Suitably secured to the opposite end of the slide 11 is a conventional cutting torch 17.

Figure 1:
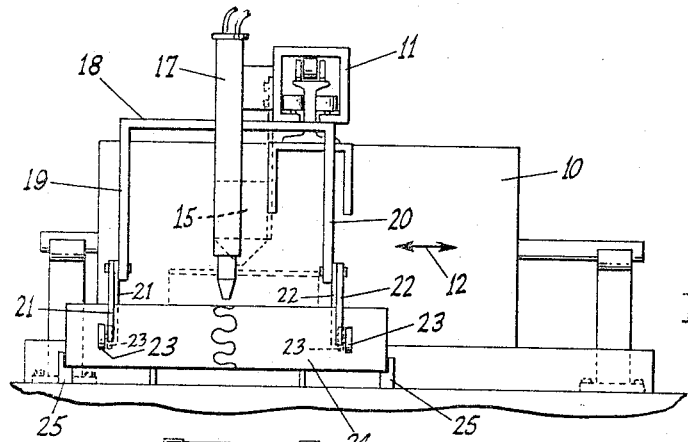
FIG. 1 is an end elevation of the tracer control cutting apparatus of this invention.

Also secured to this same end of the slide 11 is the depending bracket 18. As seen in FIG. 1, the depending bracket 18 includes the two arms 19 and 20. The arms 19 and 20 mount respectively the bifurcated guide brackets 21 and 22. Each arm of the guide brackets 21 and 22 rotatably mount a roller 23, which as clearly shown in the drawings is adapted to engage the cylindrical tube 24 being cut.

It is believed that operation of the apparatus as described above will now be easily understood. The guide brackets 21 and 22, and the rollers 23, serve to maintain the article 24 being cut directly under the cutting torch 17 at all times. Therefore, movement of the slide 10 will be effective to move the cutting torch 17 over the longitudinal axis of the tube 24. Movement of the slide 11 in a path transverse to the longitudinal axis of the article being cut will, by virtue of the guide brackets 21 and 22 and the rollers 23, be effective to roll the article being cut in a path parallel to the path of movement of the slide 11. It will be apparent that as the tube 24 rolls, its entire circumference will be disposed beneath the cutting torch 17. Hence, in response to signals from the sensing head 15 following the pattern 16, the desired cut will be made on the tubing 24.

To facilitate the making of an accurate cut, it is helpful to provide the guide rails 25 which are aligned parallel to the path of movement of the slide 11, and which serve to guide rolling movement of the tubing 24 being cut.

Figure 3:
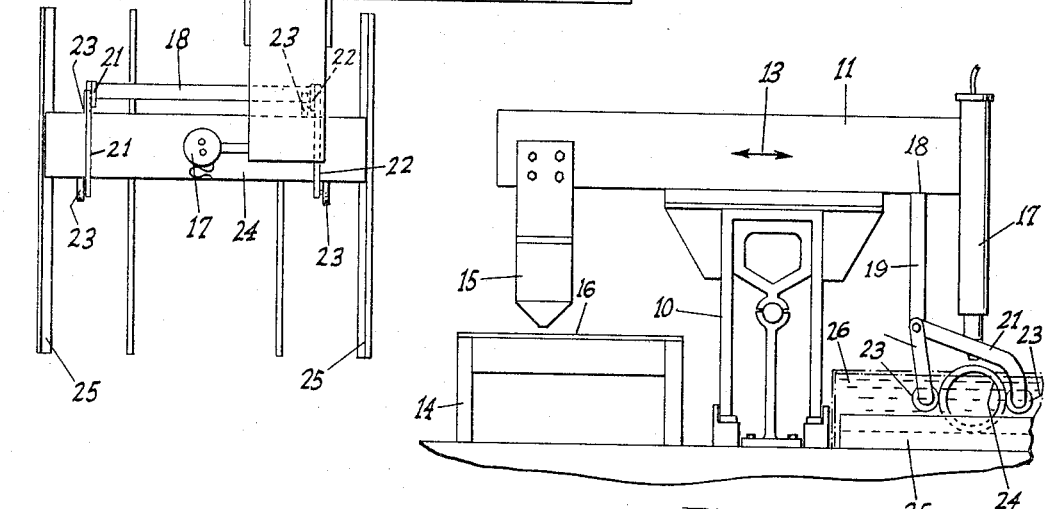
FIG. 3 is a front elevation of the apparatus of FIG. 1.

In making cuts on smaller sizes of tubing, it has been found that the slag and oxides from the cut are blown across the inside diameter of the tube, and fused to the inside of the tube opposite the cut. As the cut progresses, the portion of the tube with the slag inside comes under the torch. The slag deflects the flame, and produces a very ragged cut. In order to prevent this problem, the rails 25 will be disposed in a trough 26 filled with water to a level which exposes only the portion of pipe being cut (see FIG. 3).

Figure 4:
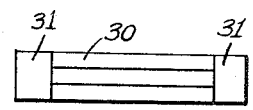
FIG. 4 is a diagrammatic elevational view of a hexagonal object provided with cylindrical adapters.

While the invention has thus far been described in terms of cutting cylindrical tubing, it will be apparent that other types of tubing (for example, square or hexagonal tubing) could be cut by means of the apparatus of this invention, if cylindrical adapters are added to the end of the tubing, and if the projection of the pattern was corrected for the different circumferential lengths. Thus, in FIG. 4 where a non-cylindrical object, as for example a hexagonal tube 30 is to be cut, cylindrical adapters 31 are fastened to the ends thereof. In such a case, it will be apparent that the rollers 23 on the guide brackets 21 and 22 would have to bear against the cylindrical adapters placed in the ends of the tubing.

Numerous modifications may be made in this invention without departing from its scope or spirit. Hence, no limitations are intended except insofar as set forth in the following claims.

The embodiments of the invention in which an exclusive property or privilege is claimed are defined as follows:

1. Tracer controlled apparatus for cutting tubing comprising:
   (a) a pattern, said pattern defining a flat projection of the line to be cut;
   (b) a pattern follower;
   (c) cutting means;
   (d) means for moving said pattern follower and cutting means in a path of travel;
   (e) means for moving an article being cut in response to movement of said pattern follower and said cutting means along said path of travel and to rotate said article about its axis during said movement; and
   (f) means for moving said pattern follower and cutting means in a direction perpendicular to said path of travel.

2. The apparatus claimed in claim 1, wherein said means for moving said article in response to movement of said pattern follower and cutting means along said path of travel and for rotating it about its axis during said movement comprises at least one depending bracket associated with said cutting means, said bracket mounting a roller adapted to engage said article being cut, whereby movement of said cutting means along said path of travel is effective to roll a cylindrical article being cut in a parallel path of travel beneath said cutting means.

3. The apparatus claimed in claim 2 including at least one guide rail disposed beneath said cutting means and substantially parallel to said path of travel, an end of said article being cut rolling on said guide rail.

4. The apparatus claimed in claim 3, wherein said bracket is bifurcated, each arm end of said bifurcated bracket mounting a roller, said rollers engaging opposite sides of said article being cut.

5. The apparatus claimed in claim 1 including means containing a supply of liquid, said article being cut being maintained at least partially submerged in said liquid.

6. The apparatus claimed in claim 1, including at least one cylindrical adapter fastener to one end portion of the article being cut, said means for moving said article in response to movement of said pattern follower and cutting means along said path of travel comprising at least one depending bracket associated with said cutting means, said bracket mounting a roller adapted to engage said cylindrical adapter, whereby movement of said cutting means along said path of travel is effective to roll said article in a parallel path of travel beneath said cutting means, whereby non-cylindrical articles may be cut.

7. The apparatus claimed in claim 6 including at least one guide rail disposed beneath said cutting means and substantially parallel to said path of travel, said cylindrical adapter fastened to said article being cut, rolling on said guide rail.

8. The apparatus claimed in claim 7, wherein said bracket is bifurcated, each arm end of said bifurcated bracket mounting a roller, said rollers engaging opposite side of said cylindrical adapter.

9. Apparatus for cutting tubing comprising:
   (a) cutting means;
   (b) means for moving said cutting means over said tubing being cut;
   (c) means for moving said cutting means in a path perpendicular to the first mentioned movement of said cutting means; and
   (d) means for rolling said tubing being cut along a path of travel parallel to said last mentioned path of movement, and at the same speed, said rolling means also causing said tubing to rotate while it is being cut.

10. The apparatus claimed in claim 9, wherein said means for moving said article in response to movement of said cutting means along said path of travel and for rotating it about its axis during said movement comprises at least one depending bracket associated with said cutting means, said bracket mounting a roller adapted to engage said article being cut, whereby movement of said cutting means along said path of travel is effective to roll a cylindrical article along said parallel path of travel.

11. The apparatus claimed in claim 10 including at least one guide rail disposed beneath said cutting means and substantially parallel to said path of travel of said cutting means, an end of said article being cut rolling on said guide rail.

12. The apparatus claimed in claim 11, wherein said bracket is bifurcated, each arm end of said bifurcated bracket mounting a roller, said rollers engaging opposite sides of said article being cut.

13. The apparatus claimed in claim 9, including cylindrical adapter members for said article being cut, said article being secured between said cylindrical adapter means, and wherein said means for moving said article in response to movement of said cutting means along said path of travel comprises at least one depending bracket associated with said cutting means, said bracket mounting a roller adapted to engage said cylindrical adapter members, whereby movement of said cutting means along said path of travel is effective to roll said article along said parallel path of travel.

14. The apparatus claimed in claim 9 including means containing a supply of liquid, said article being cut being maintained at least partially submerged in said liquid.

References Cited

UNITED STATES PATENTS

| | | | |
|---|---|---|---|
| 2,388,555 | 11/1945 | Kuehni | 90—13.5 |
| 2,726,450 | 12/1955 | Ware | 266—23 X |
| 2,806,263 | 9/1957 | Hogan | 266—23 X |

JOHN F. CAMPBELL, *Primary Examiner.*

R. F. DROPKIN, *Assistant Examiner.*